Dec. 7, 1948.

M. REISS 2,455,808

OBJECTIVE OF LOW INDEX GLASS WITH NEGATIVE
COMPONENTS OF HIGH CURVATURE
Filed June 30, 1944

| F = 100 mm. | | | | f/4.5 |
|---|---|---|---|---|
| LENS | N | V | RADII | THICKNESSES |
| I | 1.434 | 95.2 | $R_1$ = + 25.3 mm | $t_1$ = 7.4 mm. |
|  |  |  | $R_2$ = +230.1 | $S_1$ = 0.8 |
| II | 1.498 | 67.0 | $R_3$ = + 26.6 | $t_2$ = 6.5 |
| III | 1.541 | 59.9 | $R_4$ = − 53.7 | $t_3$ = 1.6 |
|  |  |  | $R_5$ = + 15.7 | $S_2$ = 11.0 |
| IV | 1.562 | 51.0 | $R_6$ = − 17.5 | $t_4$ = 1.6 |
| V | 1.501 | 56.5 | $R_7$ = + 81.0 | $t_5$ = 6.5 |
|  |  |  | $R_8$ = − 28.8 | $S_3$ = 0.5 |
| VI | 1.434 | 95.2 | $R_9$ = +356.8 | $t_6$ = 7.4 |
|  |  |  | $R_{10}$ = − 28.5 | BF = 73.7 |

*MAX REISS*
INVENTOR

BY
ATT'Y & AG'T

Patented Dec. 7, 1948

2,455,808

UNITED STATES PATENT OFFICE 2,455,808

OBJECTIVE OF LOW INDEX GLASS WITH NEGATIVE COMPONENTS OF HIGH CURVATURE

Max Reiss, Rochester, N. Y., assignor to Eastman Kodak Company, Rochester, N. Y., a corporation of New Jersey Application June 30, 1944, Serial No. 542,913

5 Claims. (Cl. 88—57)

This invention relates to photographic lenses.

An object of the invention is to provide a lens which is particularly suitable for the copying of pictures in color and for color process work in general by virtue of its freedom from secondary chromatic aberration and sphero-chromatism.

The usual mode of correcting axial and lateral color involves bringing two pre-selected wavelengths of light to a focus on the same focal plane (axial achromatism) and producing thereon two images of the same size (lateral achromatism).

A lens so achromatized still suffers from lesser chromatic aberration residuals which for many purposes are not noticeably harmful to the image, particularly in black-and-white work when only a narrow band of wavelengths is utilized.

In color process work, however, these residual aberrations assume a greater relative importance. The two most important of them are known as secondary spectrum and sphero-chromatism. The former has two aspects, axial and lateral. When a lens is achromatized, two wavelengths are brought to a common focus, but axial secondary spectrum brings the intermediate wavelengths to a focus closer to the lens and the longer or shorter wavelengths farther from the lens. The lateral secondary spectrum similarly affects an off-axis image point in a lateral direction.

This phenomenon is closely related to the partial dispersion characteristics of optical materials. The partial dispersion is conveniently designated by the symbol P and is defined by the equation:

$$P = \frac{N_{G'} - N_F}{N_F - N_C}$$

where $N_G$, $N_F$, and $N_C$ are the refractive indices for the G', F, and C lines of the hydrogen spectrum respectively. In very nearly all known optical materials, broadly referred to as glasses in this specification, the partial dispersions lie in the extremely narrow region defined by the inequality $$(0.664 - 0.0019V) < P < (0.686 - 0.0019V)$$

Some fluoride crystals and some optical glasses containing fluorides as a constituent have partial dispersions much higher than this indicated value, however, and have been used to correct certain types of lenses such as microscopes.

The effect of sphero-chromatism is usually that the short wavelengths are overcorrected for spherical aberration, while the long wavelengths are undercorrected.

A particularly favorable type of lens in regard to sphero-chromatism is the known type comprising two highly meniscus compound negative components concave toward a diaphragm therebetween and axially aligned between two positive components whose outer surfaces are more strongly curved than their respective inner surfaces. This is merely a precise definition of a well-known type of lens; a broader definition might be more exact but this limited one serves for present purposes.

Lens designers usually try to use a glass with high refractive index in the positive components of this type of lens in order simultaneously to correct the spherical aberration and to cover a comparatively wide field of view.

According to one feature of the present invention I have found that a glass of low index can be used in the said positive components and the spherical aberration and astigmatism still can be corrected for apertures of f/4.5 or more and for moderately wide angles of field. The low index glass can be one element in a compound component or alternatively the whole component can be made up of an element of the low index glass. When such a low index glass is used, it is desirable that the surfaces of the negative components be very strongly curved. The average radius of curvature of their concave surfaces should be between one-fourth and one-tenth the focal length of the objective, and that of their convex surfaces less than two-fifths and preferably less than one-third said focal length. The convex surfaces are, of course, less strongly curved than the respective concave ones, these meniscus components being negative in power.

According to another feature of the invention, the low index glass in the positive components is used in combination with a medium or low index glass in the negative elements of the negative compound components, that is, glass with refractive index between that of the low index glass in the outer positive components and 1.57.

It will be understood that by "glass" is meant any solid transparent material suitable for making lenses, including crystalline fluorite, glasses with substantial proportions of a fluoride salt, organic plastics, etc.

By using at least one of these cooperating features, I have discovered that it is practical to use glass with index of refraction between 1.55 and 1.35 in the positive components and thus to take advantage of the highly desirable partial dispersion ratios of the fluoride compounds and fluoride glasses which lie in this region. These special partial dispersion properties reduce the secondary color or eliminate it entirely.

Figures 1, 2:
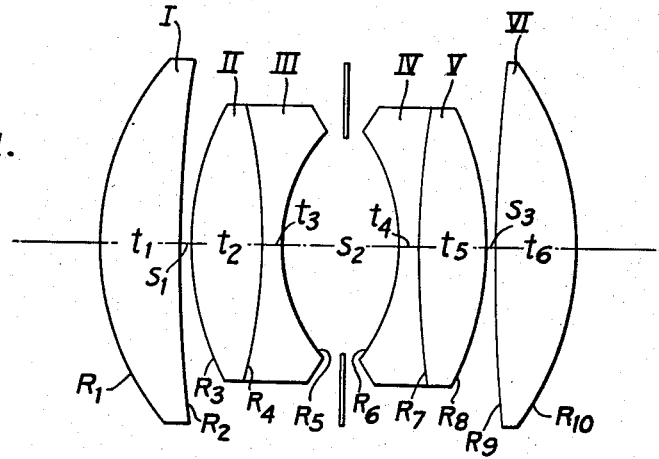
Fig. 1 shows an axial section of a lens according to the invention.
Fig. 2 shows data for one embodiment of the invention.

The constructional data for the lens shown in Figs. 1 and 2 is given in the following table:

F = 100 mm.    Aperture: f/4.5

| Lens | N | V | Radii | Thicknesses |
|---|---|---|---|---|
| I | 1.434 | 95.2 | $R_1 = +25.3$ mm. | $t_1 = 7.4$ mm. |
|   |   |   | $R_2 = +230.1$ | $S_1 = 0.8$ |
| II | 1.498 | 67.0 | $R_3 = +26.6$ | $t_2 = 6.5$ |
| III | 1.541 | 59.9 | $R_4 = -53.7$ | $t_3 = 1.6$ |
|   |   |   | $R_5 = +15.7$ | $S_2 = 11.0$ |
| IV | 1.562 | 51.0 | $R_6 = -17.5$ | $t_4 = 1.6$ |
| V | 1.501 | 56.5 | $R_7 = +81.0$ | $t_5 = 6.5$ |
|   |   |   | $R_8 = -28.8$ | $S_3 = 0.5$ |
| VI | 1.434 | 95.2 | $R_9 = +356.8$ | $t_6 = 7.4$ |
|   |   |   | $R_{10} = -28.5$ | $BF = 73.7$ |

This table is arranged in a conventional manner with lens elements, radii of optical surfaces R, thicknesses of element t, and spaces S between components each numbered from front to rear and with the index N given for the D line of the spectrum and the dispersive index $$V = \frac{N_D - 1}{N_F - N_C}$$

The lens as shown is corrected for a magnification of approximately 5:1. It will be noted that the average of $R_3$ and $R_6$ is 16.6 mm. which is between $\frac{1}{10}$ and $\frac{1}{4}$ of the focal length of the objective, and also that $R_3$ and $R_8$ are each less than $\frac{1}{3}$ the focal length of the objective, all in accordance with the invention.

The lens shown in Figs. 1 and 2 employs crystalline calcium fluoride commonly known as fluorite in both outer positive components. Fluorite has a low index (1.434) but not as low as some other fluorides. It has a very low dispersion (i. e. high dispersion index V), the index being 95.2. Accordingly, the corresponding "flint" glass used in lenses III and IV for achromatizing has a higher dispersion index than customarily used in this position. Fluorite has a partial dispersion ratio as above defined equal to 0.557, according to published data. This is greater than the specified $P > (0.664 - 0.0019V)$ or 0.483 in accordance with a preferred feature of the invention.

I claim:

1. A corrected photographic objective of the kind comprising two highly meniscus compound negatives components concave toward a diaphragm therebetween and axially aligned between two positive components whose outer surfaces are more strongly curved than their respective inner surfaces, the objective being characterized by having each of the two positive components include an element made of optical material of refractive index between 1.35 and 1.55 and by the average radius of curvature of the concave surfaces of the negative components being between one-tenth and one-fourth of the focal length of the objective, and that of their convex surfaces being less than one-third the focal length.

2. An objective according to claim 1 in which the negative components are doublets and include negative elements whose average refractive index is less than 1.57.

3. An objective according to claim 1 in which the said optical material is a fluoride crystal.

4. An objective according to claim 1 in which the said optical material has a partial dispersion ratio $$\frac{N_{G'} - N_F}{N_F - N_C}$$

greater than $0.686 - .0019V$, where $N_{G'}$, $N_F$, and $N_C$ are the refractive indices for the G', F, and C lines of the spectrum and V is the dispersive index.

5. An objective substantially according to the following specifications:

| Lens | N | V | Radii | Thicknesses |
|---|---|---|---|---|
| I | 1.43 | 95 | $R_1 = +0.25F$ | $t_1 = 0.07F$ |
|   |   |   | $R_2 = +2.3F$ | $S_1 > 0.05F$ |
| II | 1.50 | 67 | $R_3 = +0.27F$ | $t_2 = 0.06F$ |
| III | 1.54 | 60 | $R_4 = -0.5F$ | $t_3 > 0.05F$ |
|   |   |   | $R_5 = +0.16F$ | $S_2 = 0.1F$ |
| IV | 1.56 | 51 | $R_6 = -0.17F$ | $t_4 > 0.05F$ |
| V | 1.50 | 56 | $R_7 = +0.8F$ | $t_5 = 0.06F$ |
|   |   |   | $R_8 = -0.29F$ | $S_3 > 0.05F$ |
| VI | 1.43 | 95 | $R_9 = +3.6F$ | $t_6 = 0.07F$ |
|   |   |   | $R_{10} = -0.28F$ |   | where the first column designates the lens elements by Roman numerals in order from front to rear and where F is the focal length of the objective, N is the index of refraction for the D line of the spectrum, V is the dispersive index, R, t, and S refer respectively to the radii of curvature of the refractive surfaces, the thicknesses of the elements, and the airspaces between the components, the subscripts on these refer to the surfaces, the elements, and the spaces numbered consecutively from the front, and the + and − signs in the fourth column correspond to surfaces which are respectively convex and concave to the front.

MAX REISS.

REFERENCES CITED

The following references are of record in the file of this patent:

UNITED STATES PATENTS

| Number | Name | Date |
|---|---|---|
| 212,099 | Knapp | Feb. 11, 1879 |
| 583,336 | Rudolph | May 25, 1897 |
| 1,394,078 | Frederick | Oct. 18, 1921 |
| 1,541,407 | Spangenberg | June 9, 1925 |
| 1,584,272 | Bertele | May 11, 1926 |
| 1,786,916 | Merte | Dec. 30, 1930 |
| 2,085,437 | Michelssen | June 29, 1937 |
| 2,117,252 | Lee | May 10, 1938 |
| 2,143,813 | Wood | Jan. 10, 1939 |
| 2,271,227 | Lee | Jan. 27, 1942 |
| 2,319,171 | Warmisham et al. | May 11, 1943 |

FOREIGN PATENTS

| Number | Country | Date |
|---|---|---|
| 165,657 | Great Britain | July 7, 1921 |